Dec. 28, 1965   A. R. APPLEGARTH, JR   3,226,714
AIRBORNE DISTANCE MEASURING EQUIPMENT
Filed June 5, 1963
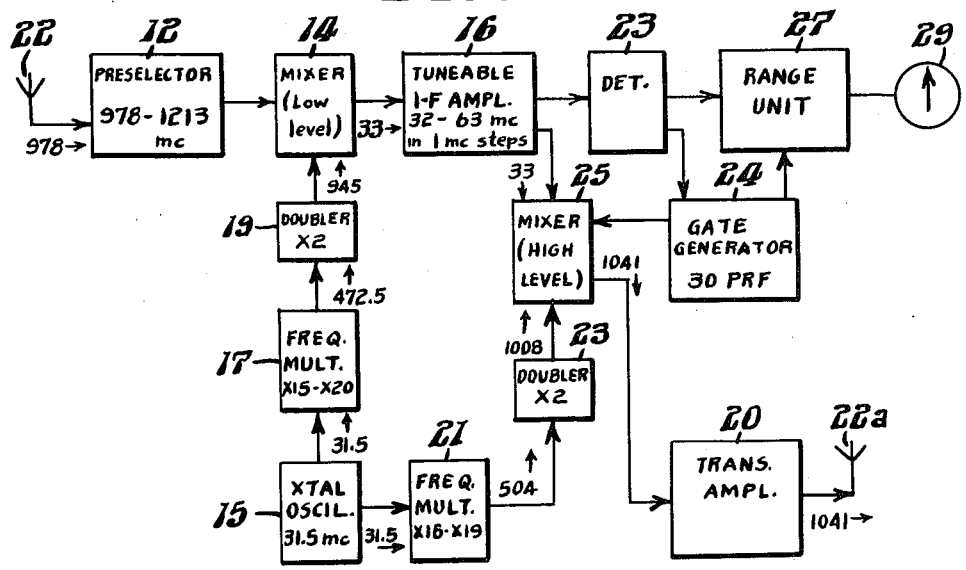
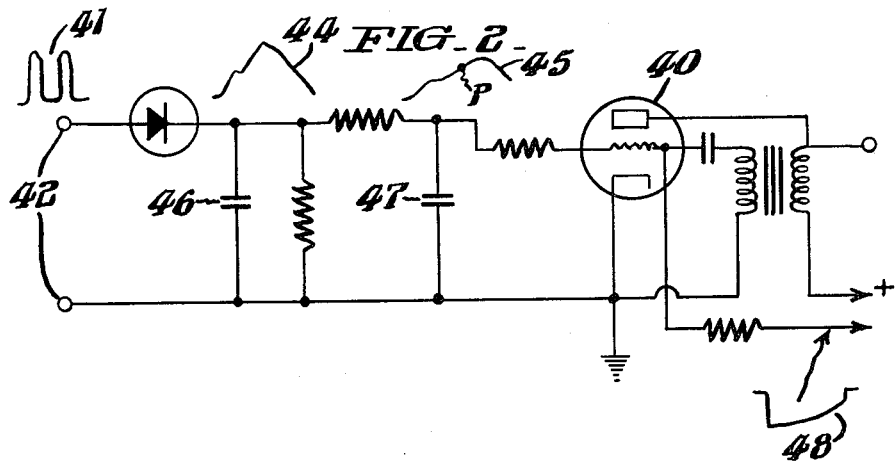
INVENTOR.
*Alexander Rufus Applegarth, Jr.*
BY
*Paul & Paul*
ATTORNEYS

United States Patent Office 3,226,714
Patented Dec. 28, 1965

3,226,714
AIRBORNE DISTANCE MEASURING EQUIPMENT
Alexander R. Applegarth, Jr., Plymouth Meeting, Pa., assignor to National Aeronautical Corporation, Fort Washington, Pa., a corporation of Pennsylvania
Filed June 5, 1963, Ser. No. 285,647
5 Claims. (Cl. 343—6.8)

The DME (Distance Measuring Equipment) system currently used for measuring the distance between aircraft in flight and selected ground stations comprises a UHF radio transmitter in the aircraft (called an interrogator) which sends a series of coded pulse pairs to the ground station (called a transponder). Each ground station operates at a particular assigned carrier frequency. Upon receipt of interrogation signals at the assigned carrier frequency and with the prescribed pulse spacing, the ground station or transponder sends out a reply pulse pair on another UHF frequency which is related by a fixed difference (±63 mc.) to the interrogation carrier frequency. Upon receipt of a properly coded pulse signal on the correct UHF frequency and synchronously related to the interrogation rate, the aircraft transmitter or interrogator accepts the reply signal and displays to the operator of the aircraft the elapsed time delay as an equivalent distance to the ground station.

Conventional interrogators consist of a 100-channel, crystal-controlled pulse transmitter operating in the frequency range 1041 to 1150 megacycles (mc.). Crystal saving techniques have reduced the requirements to 21 crystals, as used in several commercially available interrogators, as for example, in Narco Models UDI-2 and UDI-3 Distance Measuring Equipments, manufactured by National Aeronautical Corporation, Fort Washington, Pennsylvania, but the cost of even this reduced number of crystals amounts to a substantial part of the cost of the interrogator. It is one object of the present invention to reduce the crystal requirements at the interrogator to a single crystal, while retaining 100-channel operation, with each interrogation frequency being maintained within the close tolerances prescribed by law.

In order to conserve spectrum bandwidth by permitting close channel spacing and at the same time achieving maximum system accuracy, as limited by pulse rise and fall time, a specially shaped rounded pulse is used in the DME system. Generating this shaped pulse within the interrogator requires a certain amount of complex and expensive components and circuitry. It is another object of this invention to eliminate the need for such pulse generating components and circuitry at the interrogator by using the received shaped pulses from the transponder signal to generate in the aircraft similarly shaped pulses for airborne interrogation.

Mention was made hereinabove of the DME system's requirement for coded pulse pairs for both interrogation and reply. Identical pulse spacing is used in both directions, the spacing between pulses of a pair being 12 microseconds. The proper pulse spacing for the interrogation is usually obtained by the use of a precision time delay. It is another object of this invention to make use of the reply pulse spacing as generated in the transponder to control the airborne interrogation pulse spacing, thereby eliminating the need for a precision time delay for this purpose within the interrogator.

An interrogator according to my present invention which achieves the above three separate but related objectives is illustrated in the drawing in which:

FIG. 1 is a block diagram of an interrogator embodying my present invention in one form; and FIG. 2 is a schematic circuit diagram of a blocking tube oscillator adapted to function as the 30 pulse per second gate generator of FIG. 1.

The interrogation cycle, according to my present invention, starts with the reception of a selected ground transponder signal as contrasted with the usual direct generation of an interrogation signal. It is characteristic of the transponder to radiate a series of properly spaced pulse pairs occurring at an average random rate amounting to either 700 or 2700 pulse pairs per second, depending on whether or not the transponder is also furnishing azimuth information in the form of amplitude modulations of the pulse train. Some of these pulse pairs constitute replies to distance interrogations from a plurality of aircraft interrogators, which occur at a rate of about 30 pulse pairs per second from each aircraft. The remainder consists of reference signal pulse pair bursts for azimuth use, and pulse pairs added at random time intervals as needed to maintain the average rate of 700 or 2700 pulse pairs per second, as determined by the particular class of ground transponder involved. Thus, the interrogator receiver output will comprise pulse pairs occurring at either a 700 or a 2700 per second rate.

As illustrated in FIG. 1, the receiver consists of a preselector filter 12 which may be either narrowband (tuned to the selected ground transponder) or broadband (respond to all ground transponders), connected between the receiving antenna 22 (which may also serve as transmitting antenna) and a suitable UHF low level mixer 14. A selected harmonic of a 31.5 mc. crystal oscillator 15 is also fed, by way of the frequency multiplier 17 and the doubler 19, into mixer 14 so as to heterodyne with the incoming pulse pairs from the transponder received in the preselector 12. The difference frequency between the selected oscillator harmonic from doubler 19 and the transponder frequency from preselecter 12 is then amplified in a tuneable I.F. amplifier 16, as is customary in a superheterodyne receiver. Since the beating frequency (due to the doubler 19) can only change by multiples (harmonics) of 63 mc., (31.5×2), the I.F. amplifier 16 is tuned in increments corresponding to transponder frequency channel spacings. In the system of FIG. 1, for example, the preselector 12 is shown as adapted to receive incoming signals of from 978 to 1213 megacycles. These signals are heterodyned in mixer 14 with the signals delivered by doubler 19. Since the signals delivered by doubler 19 are derived from the 31.5 mc. crystal oscillator 15 whose output is passed through frequency multiplier 17 adapted to deliver either the 15th, 16th, 17th, 18th, 19th or 20th harmonic of the 31.5 mc. signal, the output of doubler 19 is either 945 mc. (the 15th harmonic) or 1008 mc. (the 16th harmonic), or 1071 mc. (the 17th harmonic) or 1134 mc. (the 18th harmonic), or 1197 mc. (the 19th harmonic), or 1260 mc. (the 20th harmonic). Signals at one of these five frequencies when mixed in mixer 14 with the incoming signal from preselector 12, produces I.F. signals in the 32 to 63 megacycle range, which is the range of the tunable I.F. amplifier 16. For example, the 945 mc. signal may be heterodyned with incoming signals of from 978 to 1008 mc., the 1071 mc. signal may be heterodyned with incoming signals from 1008 to 1039 mc., the 1008 mc. signal may be heterodyned with incoming signals of from 1040 to 1071 mc., the 1134 mc. signal may be heterodyned with incoming signals of from 1071 to 1102 mc., the 1071 mc. signal may be heterodyned with incoming signals of from 1103 to 1134 mc., the 1197 mc. signal may be heterodyned with incoming signals of from 1134 to 1165 mc., the 1134 mc. signal may be heterodyned with incoming signals of from 1166 to 1197 mc., and the 1260 mc. signal may be heterodyned with incoming signals of from 1197 to 1213 mc. Thus, the entire range of incoming signals of preselector 12 may be heterodyned down to signals in the 32 to 63 mc. range of the tunable I.F. amplifier 16.

The linearly amplified I.F. signal from I.F. amplifier 16 is then mixed at high level in mixer 25 with a harmonic of the 31.5 mc. oscillator 15 which is one order (63 mc.) removed from the harmonic used in the low-level receiver mixer 14. The result of this second heterodyne is to produce a new UHF frequency which will always be 63 mc. removed from the original transponder reply frequency selected in preselector 12. The desired sum or difference frequency is then linearly amplified in transmitter amplifier 20 to a power level suitable for interrogation.

Since the system parameters include a constant 63 mc. frequency separation between interrogation and reply on all channels, it will be seen that a double heterodyne frequency shift using adjacent harmonics of a 63 mc. fixed oscillator becomes possible. However, in lieu of using a 63 mc. fixed crystal oscillator, it is preferable to use a 31.5 mc. crystal oscillator and a doubler, as illustrated.

It would be undesirable for each of 2700 transponder pulse pairs received by an aircraft to result in an interrogation pulse pair because the transponder would overload. To avoid such overloading, each interrogator must be limited to a maximum interrogation rate of 30 pulse pairs per second if as many as 90 airplanes are to independently interrogate the same transponder without exceeding the 2700 pulse pairs per second rate limit imposed by transponder duty cycle requirements. Therefore, it is necessary to introduce a gating circuit 24 which will disable the interrogator transmitter for about $\frac{1}{30}$ second directly following each interrogation before allowing another pulse pair to be transmitted. Thus, although randomly spaced pulse pairs are being received from the transponder at a rate of 700 or 2700 pairs per second, they are being transmitted as an interrogation of about 30 pulse pairs per second. It is to be noted that the pulse pairs being received from the transponder are at random spacing. Thus, the interrogation pulse pairs are transmitted at a random rate. A precise control of the interrogation rate is neither necessary nor desirable. A slight random variation or "jitter" in the interrogation rate will serve to prevent accidental synchronism between interrogation from two or more aircraft which could create confusion in the recognition of the transponder replies to a specific interrogator.

With the interrogator circuit configuration illustrated in FIG. 1, the UHF frequency of the ground transponder, displaced 63 mc., and the rounded pulse shape and precise pulse spacing of the transponder are preserved and used for interrogation, eliminating the need for components and circuitry in the interrogator to perform these functions directly.

A second output from the I.F. amplifier 16 is demodulated in detector 23 and fed into the range metering circuits 27 along with a reference signal derived from the transmitter gate generator 24 to display on indicator 29 the distance to the station, using components and practices well known to the distance measuring equipment art.

In FIG. 2 is shown a suitable circuit for the 30 pulse per second gate generator 24 of FIG. 1. The circuit shown comprises the blocking oscillator tube 40 and associated components and connections. The pulse pairs 41 from detector 23 (which are at the rate either of 700 or 2700 pulse pairs per second) are applied to the input terminals 42 and are rectified and filtered to produce the waveforms 44 and 45 illustrated, the rising leading edge of the waveforms being produced by the closely spaced pulses of the pair 41, and the falling trailing edge being produced by the discharge of capacitors 46 and 47 during the interval between pulse pairs. (If the mean PRF (pulse rate frequency of the pulse pairs) of the ground station is 2700 pulse pairs per second, the mean time between pulse pairs is 370 microseconds, whereas if the PRF of the ground station is 700, the mean time between pulse pairs is 1420 microseconds.) The blocking tube oscillator (BTO) is fired at about point P on waveform 45, and since the BTO is chosen to have a period of $\frac{1}{30}$ second, the BTO cannot be fired again during the $\frac{1}{30}$ second period. The output waveform 48 of the BTO is applied to the mixer 25 and also to the range unit 27 of FIG. 1.

To summarize the operation of the proposed airborne distance measuring equipment, it should be remembered that the ground station (the transponder) is transmitting at a particular assigned carrier frequency. It is transmitting pulses in pairs, at a pulse rate of either 700 pulses per second or 2700 pulses per second, depending upon whether it is also transmitting azimuth information. If the latter, then the higher pulse rate. The circuit of the present invention can use either the 700 pulses per second, or the 2700 pulses per second which are being transmitted at all times, irrespective of whether there is an interrogating craft in the area or not. These pulse pairs are being transmitted at random spacing, so far as the spacing between pulses of different pairs is concerned. That is, spacing between the pulses of the same pair is fixed, being for example, 12 microseconds, but the spacing between the pairs of pulses is random, and may be approximately 370 microseconds (assuming 2700 pulse pairs per second). Many of these pulse pairs are being transmitted by the ground station as a response to interrogating craft in the area; others are not.

To operate the new interrogator of the present invention, our particular craft first tunes the preselector to the carrier frequency of the particular ground station, which we will assume to be 978 megacycles. There is only one megacycle difference between assigned station frequencies. Thus, another station somewhere in the area may be transmitting on 979 megacycles. Unless we heterodyne down, the I.F. selector circuits could not properly distinguish between 978 and 979 megacycles. Therefore, in the system of the present invention the carrier frequency is heterodyned down. In the present example, the 978 megacycles is heterodyned down to 33 megacycles in mixer 14, amplified in the I.F. amplifier 16, and then detected in detector 23 so that the output of the detector 23 is say 2700 pulse pairs per second. These pulses are then applied to gate generator 24 which opens 30 times a second, but closes as soon as a pulse pair has been received. A suitable circuit for gate 24 is the blocking tube oscillator, shown in FIG. 2. Thus, a particular pair of pulses passes through the gate 24 approximately every 30th of a second. It will be understood that the spacings between the pulse pairs passing through gate 24 are not precisely equal, since the blocking tube oscillator is triggered by the first random pulse following its recovery from cut-off condition. The pulse pairs passing through gate 24 are used to modulate mixer 25 operating at a frequency of, for example, 1041 megacycles, which is 63 megacycles higher than the received frequency of 978 megacycles. The pulses delivered by mixer 25 are then amplified by the transmitter amplifier 20 and transmitted, using antenna 22a, which may be the same antenna as the receiving antenna 22.

It will be understood that the purpose of heterodyning down and then heterodyning up, is to provide improved selectivity in the I.F. amplifier 16.

As compared with prior art DME interrogator equipment, the interrogator of the present invention requires but a single crystal, a 31.5 mc. crystal or a 63 mc. crystal. The prior art interrogators, such as the Narco Models UDI-2 and UDI-3 previously mentioned, require 21 crystals. In the new interrogator, there is no need to provide equipment for generating pulses of proper shape and spacing. It is, of course, necessary that the equipment preserve the spacing and shape of the pulses received from the ground station.

It will be understood that the pulse repetition rate of 30 pulse pairs per second represents a very rapid interrogation relative to the movement of the craft so that the time delay in receiving the response from the ground station does not change to any significant extent even though the craft may be miles from the station.

While the preferred embodiment of this invention has been described in some detail, it will be obvious to one skilled in the art that various modifications may be made without departing from the invention as hereinafter claimed.

What is claimed is:

1. In an interrogator-transponder-responser system for airborne aircraft in which pairs of shaped precisely-spaced high-frequency pulse signals are transmitted at random intervals by ground station transponders at least some of which signals are ordinarily at least in response to interrogation signals from interrogating aircraft, the method of producing pairs of similarly shaped interrogation signals aboard the aircraft, said method comprising the steps of receiving aboard the particular aircraft from a selected ground station transponder randomly-spaced pairs of shaped high frequency pulse signals none of which are necessarily in response to interrogation signals previously transmitted from said particular aircraft, converting said received pulse signals into pairs of similarly shaped pulse signals of a different high frequency, and selecting certain of said pairs of converted signals for transmission to said selected transponder as interrogation signals.

2. The method claimed in claim 1 characterized in that the step of selecting certain of said pairs of converted signals for transmission includes the step of gating converted signals through at generally regular but random times, to transmit interrogation pulse signals at generally regular but random times.

3. The method claimed in claim 2 further characterized in that the step of gating includes the step of applying a gating signal at said generally regular but random times to a time measuring device to mark the start of a time interval to be measured.

4. The method claimed in claim 3 further characterized in that the step of converting received pulse signals to shaped pulse signals at a different high frequency includes the steps of: generating locally a signal of high oscillation frequency, heterodyning said oscillation frequency signal with the received pulse signals to produce pulse pairs at a relatively low difference-frequency, amplifying the difference-frequency pulse signals, generating locally a second signal of high oscillation frequency of different frequency from said first high oscillation frequency signal, and heterodyning said second high oscillation frequency signal with said difference-frequency pulse signals to produce sum-frequency pulse signals for selected transmission as interrogation signals.

5. The method claimed in claim 4 further characterized in that said step of gating includes the steps of utilizing a pair of difference-frequency pulse signals to disable the gating means for a selected time interval, and for utilizing the first pair of difference-frequency pulse signals following recovery of the disabled gating means to again disable said gating means.

References Cited by the Examiner

UNITED STATES PATENTS

| | | | |
|---|---|---|---|
| 2,427,191 | 9/1947 | Brink | 343—101.1 |
| 2,706,244 | 4/1955 | Kuder | 343—101.1 |
| 2,759,180 | 8/1956 | Wrenn | 343—6.8 X |
| 2,929,925 | 3/1960 | O'Day et al. | 343—6.8 |
| 2,938,202 | 5/1960 | Kirch et al. | 343—6.8 X |
| 3,025,516 | 3/1962 | Bickler | 343—6.5 |
| 3,035,262 | 5/1962 | Vantine | 343—6.8 X |
| 3,159,832 | 12/1964 | Cox. | |

CHESTER L. JUSTUS, *Primary Examiner.*

LEWIS H. MYERS, *Examiner.*